Figure 1:
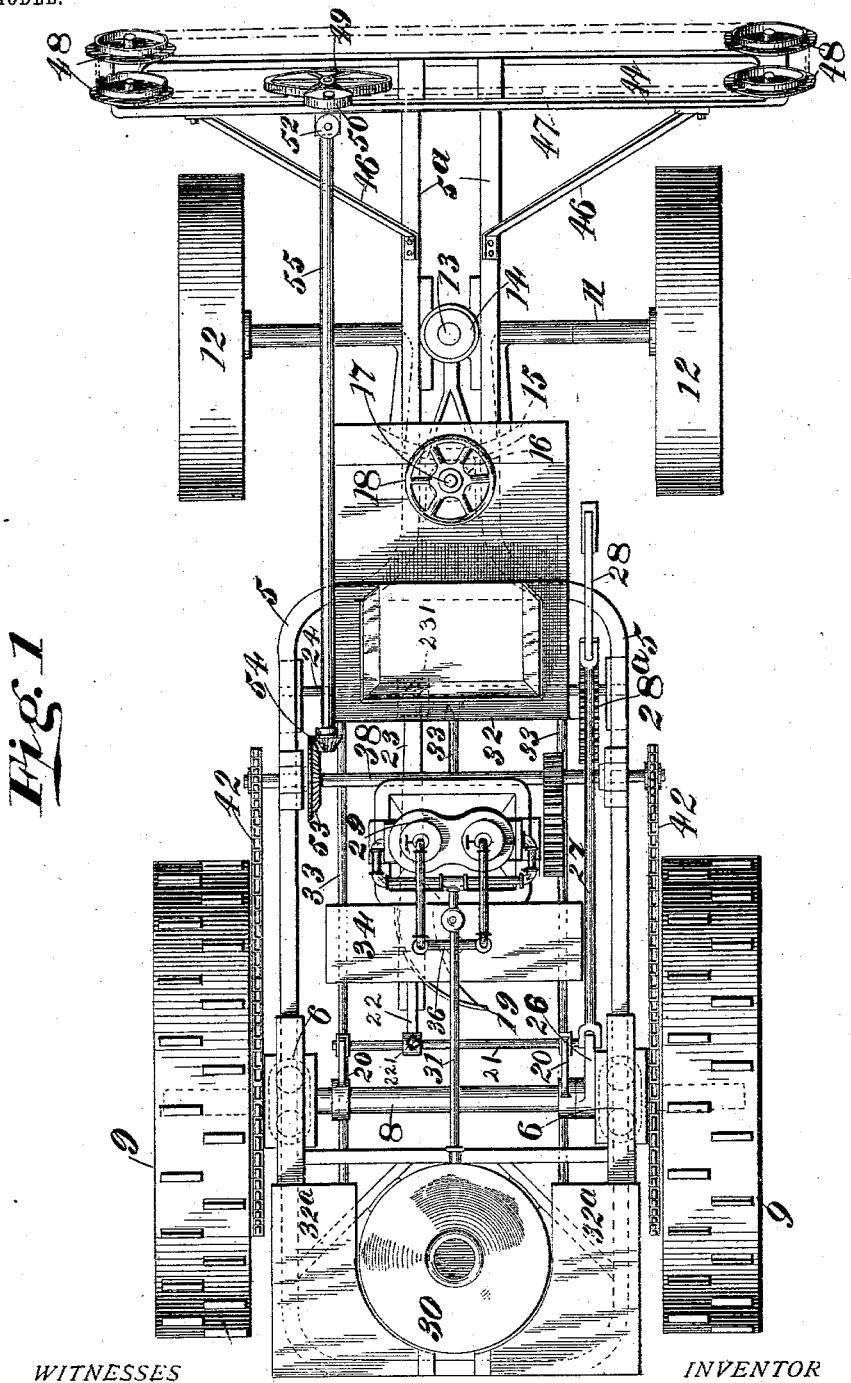

No. 748,706. PATENTED JAN. 5, 1904.
J. DOWNING.
AGRICULTURAL IMPLEMENT.
APPLICATION FILED OCT. 4, 1902.
NO MODEL. 3 SHEETS—SHEET 1.

WITNESSES
INVENTOR
Jacob Downing

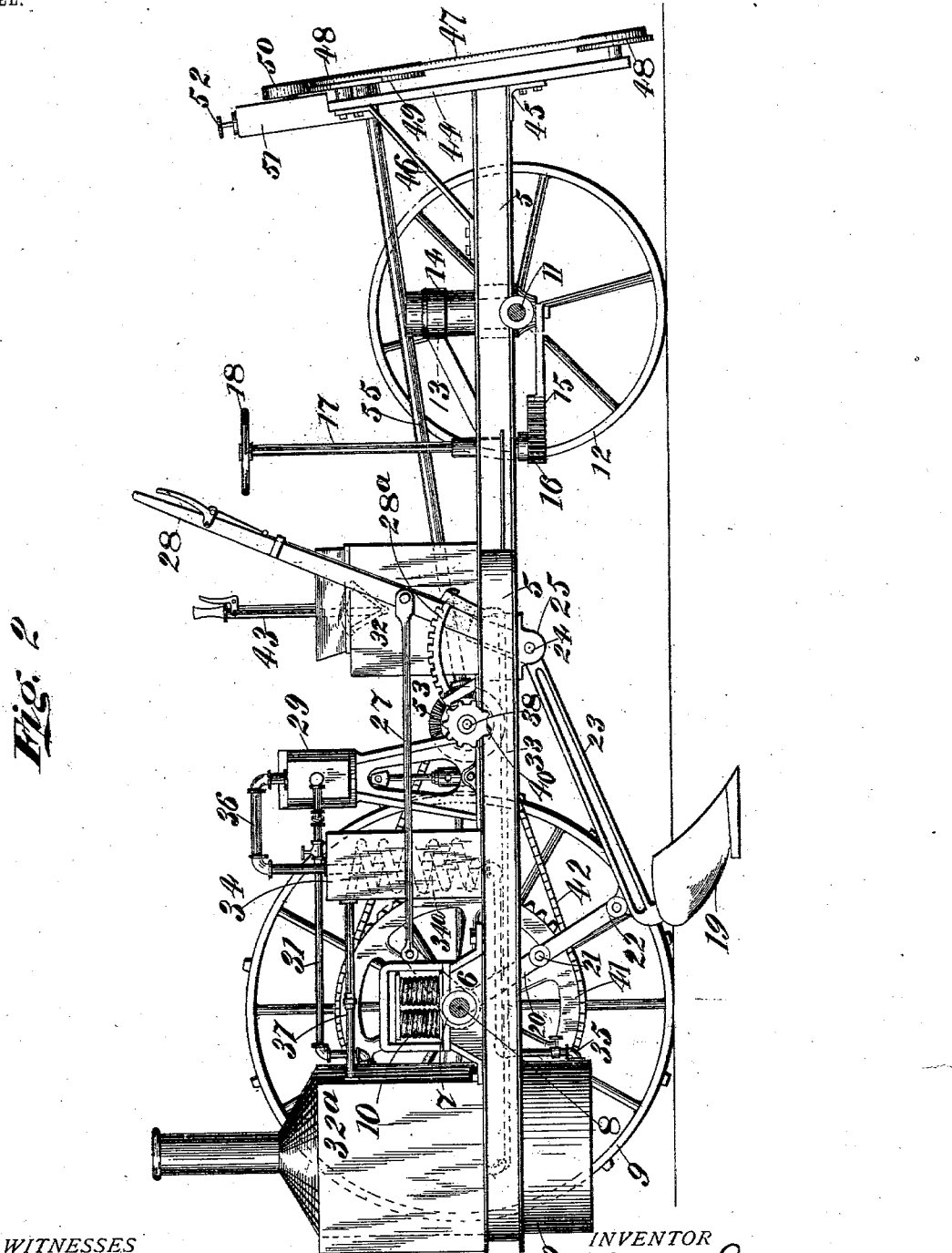

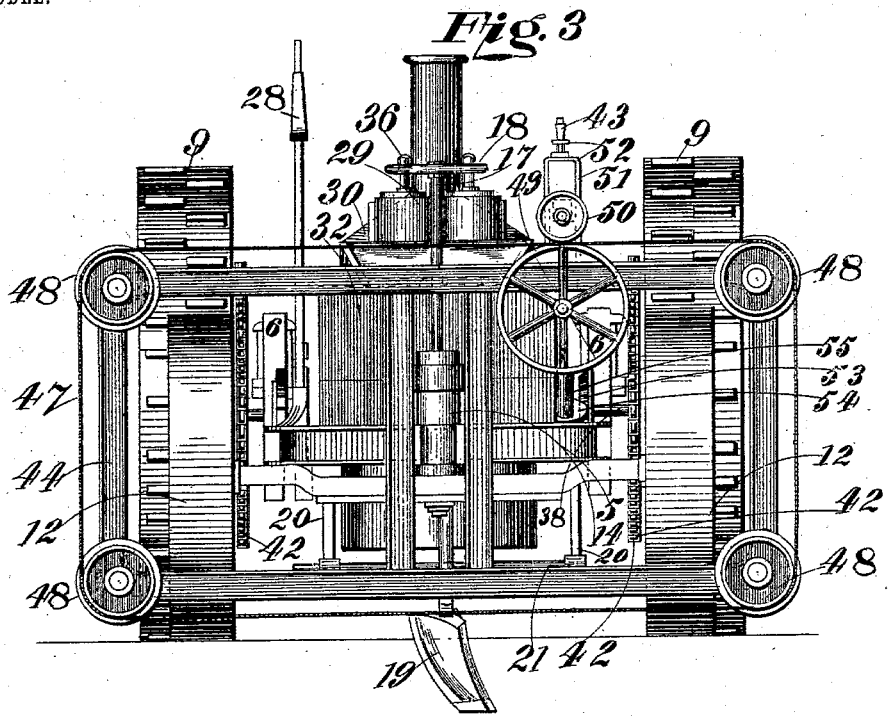

No. 748,706. Patented January 5, 1904.

UNITED STATES PATENT OFFICE.

JACOB DOWNING, OF DENVER, COLORADO.

AGRICULTURAL IMPLEMENT.

SPECIFICATION forming part of Letters Patent No. 748,706, dated January 5, 1904.

Application filed October 4, 1902. Serial No. 125,903. (No model.)

*To all whom it may concern:*

Be it known that I, JACOB DOWNING, of Denver, in the county of Arapahoe and State of Colorado, have invented certain new and useful Improvements in Agricultural Implements; and I hereby declare that the following is a full, clear, and exact description thereof, reference being had to the accompanying drawings, which form part of this specification.

This invention is an improvement in agricultural implements, such as plows; and its object is to provide an automobile-machine which can be operated as a steam-plow, as an automobile, or power-actuated mower.

The invention consists in the improved construction of the machine whereby it is adapted for various purposes hereinafter explained, and the particular features upon which the protection is desired are set forth in the claims, to which I refer for summaries of the invention.

In the accompanying drawings, which embody the invention, Figure 1 is a plan view of the complete machine with the exception that portions of the reversing mechanism of the engine are omitted. Fig. 2 is a side elevation of such machine; Fig. 3, a front view thereof.

The main frame 5 of the machine is preferably composed of U-shaped angle-iron bent into a frame of the desired width and length, its members converging at front and being rigidly united to a casting 14, beyond which the side members of the machine are extended, as indicated at 5ª, for a purpose hereinafter explained. In this casting 14 is journaled a king-pin 13, which is rigidly connected with the front or steering axle 11, and thereby connects the same to the frame, the front wheels 12 being journaled on the ends of axle 11 in the ordinary manner. Attached to axle 11 is a segment 15, which meshes with a pinion 16 on the lower end of a vertical shaft 17, suitably journaled on the main frame of the machine and having on its upper end a hand-wheel 18, by which it can be conveniently operated by the driver, who has a seat upon a tank 32, supported on the frame in rear of the front axle, and which tank may be used as a water-tank. The rear end of the frame is supported on an axle 8, which has bearings in journal-blocks 7, guided in yokes 6, rigidly attached to the sides of the frame, springs 10 being interposed between the bearings 7 and the tops of the yokes 6, so as to cushion the frame upon the axle. This axle 8 is rotatable in the bearings 7 and also rotatable in the hubs of the driving-wheels 9. In other words, said wheels are journaled upon the ends of the axle, and said axle is also rotatable in its bearings. The wheels 9 are provided with sprockets 41 on their inner sides, which may be driven by sprocket-chains 42 from smaller sprockets 40 on a main driving-shaft 38, suitably journaled in the frame in front of the wheel 9 and driven by means of pinions 39 and 27 from the shaft of engine 29. The engine may be of any suitable construction, but is preferably a double-cylinder steam-engine mounted upon the frame in advance of the rear axle and in rear of the water-tank 32. This engine is supplied with steam from a boiler 30, supported on the main frame in rear of the rear axle and connected with the engine by a steam-pipe 31. The boiler is preferably fired with oil supplied thereto from the oil-tank 34 in rear of the engine and in front of the rear axle, oil being withdrawn from the tank 34 and conducted to the combustion-chamber of the boiler 30 through the pipe 35. The exhaust-steam from the engine 29 is preferably conducted by a pipe 36 into and through a coil 34ª in tank 34, so as to warm the oil, and is then conducted by pipe 37 to the rear water-tank 32ª, which partially surrounds the boiler and communicates with the front water-tank 32 by means of a connecting-pipe 33. The boiler is supplied with water from said water-tanks by a suitable pump or injector, (not shown,) and crude oil is preferably used as a fuel; but I do not wish to restrict myself to the use of oil as fuel.

In front of and below shaft 38 is a shaft 24, secured transversely to the frame, and from this shaft may be hung the beams 23 of a plow or series of plows—only one being shown in the drawings. The rear end of each beam 23, adjacent to the plow 19, is connected by a link 22 to a transverse bar 21, secured to crank-arms 20 on axle 8, said bar 21 lying parallel with the axle. The axle 8 is provided with a crank-arm 26, connected by a rod 27 to a hand-lever 28, provided with a handlatch by which it may be locked to a segment 28ª to the front of the machine. The hand-lever 28 is within easy reach of the operator, and by means of this lever the axle 8 can be rocked in its bearings, and thus caused to raise or lower the plow or plows 19, as desired, and to regulate the depth at which the same shall operate. Where only one or two plows are used, they may be adjusted laterally of the machine by sliding beam 23 on shaft 24 and the link 22 on bar 21, so as to compensate or correct any tendency of the machine to turn sidewise, as it might when operating in very heavy soil, where the traction of the wheel on the plowed ground would be less than the traction of the wheel on the solid ground.

The plow or plows may be secured in the positions to which they are adjusted by shifting beam 23 on the shaft 24 by any suitable means, a set-screw 231 being indicated in Fig. 1 for this purpose. Likewise the link or links 22 may be secured in adjusted position on bar 21 by any suitable means, a set-screw 221 being shown in Fig. 1 for this purpose.

While but one beam 23 and one link 22 are shown in drawings, it is obvious that there is ample room for placing a plurality of parallel beams and links in the machine.

On the forward extension 5ª of the main frame is supported a cutting apparatus, consisting, briefly, of a rectangular frame 44, having pulleys 48 at its corners, over which is guided an endless band-cutter 47, which is driven by frictional pulleys 49 and 50. Pulley 49 is mounted on shaft 55, which is driven by gears 54 53 from shaft 38. Pulley 50 is mounted on a slide 50ª, guided in yoke 51, depressed by spring 51ª, whose tension is regulable by screw 52. This cutting apparatus forms the subject-matter of a divisional application, Serial No. 135,156, filed December 13, 1902, and is not claimed herein.

The operation of the apparatus may be briefly stated as follows: When used as a plow only, the cutters may be removed and a single plow or a number of plows, if desired, may be suspended from the frame, as above explained, and when the machine reaches the point where it is desired to operate the plows are lowered into working position by lever 28, which by suitable connections rocks axle 8 and raises and lowers the plows and will hold them at any desired depth. In operating upon ground where there is a large growth of grass or weeds, such as is frequently found on prairie land, the cutter may be used simultaneously with the plows and will clear the ground in advance thereof and greatly facilitate the operation of the plows and the turning under and covering up of the vegetable growth. Where it is desired to use the machine simply for mowing, the plows can be lifted by suitably rocking axle 8 so as not to be in operative position. It is obvious that both the plows and the cutter may be thrown out of operation, and the machine could then be used as a draft-engine for hauling heavy loads on the farm and as a general utility draft-machine.

While I have illustrated in the drawings a plow connected to the main frame, in practice other farming implements, such as a harrow or pulverizer, may be used, either with or as a substitute for the plow, and these or some other heavy implement could be raised and lowered in position like the plow at the will of the operator by means of the lever 28. Furthermore, the feature of having the main axle rotatable in its bearings on the frame and wheels rotatable on said axle, whereby the axle serves both as a support for the frame upon the wheels and also as a convenient means for adjusting the plows or other implements into or out of working position, could be employed where the machine is propelled by animal power.

Having thus described my invention, what I therefore claim as new, and desire to secure by Letters Patent thereon, is—

1. The combination of the main frame, the pivoted front axle, wheels journaled thereon, and means for oscillating said axle; the rocking rear axle rotatable in journals on the main frame, the wheels rotatably mounted on the rear axle, an implement connected with the frame in advance of the rear axle and having a link-and-crank connection with said axle, whereby the implement may be raised or lowered in operative position by rocking said axle, substantially as described.

2. The combination of the main frame, the front steering-axle, wheels journaled thereon, and means for oscillating said axle, the rear axle rotatable in journals on the main frame, and the driving-wheels rotatably mounted on the rear axle; with a beam connected with the frame in advance of the rear axle, a link-and-crank connection between said beam and axle, whereby the beam may be raised or lowered by rocking said axle, means for rocking said axle, and means for propelling the driving-wheels, substantially as described.

3. The combination of the main frame, an axle rotatably journaled in bearings on the main frame, the lever and connections for rocking said axle in its bearings, and the main wheels journaled on said axle; with a bar parallel with the main axle and fixed to cranks thereon, a beam connected to a transverse shaft in advance of the axle, and a link connecting the rear end of said beam to said bar, substantially as described.

4. The combination of the main frame, the front steering-axle and wheels, a rear main axle rotatably journaled in its bearings on the frame, and driving-wheels rotatable upon said axle; with a laterally-adjustable beam pivotally connected with the frame in advance of said rear axle, a laterally-adjustable link connecting the beam to a crank on said axle, and means for rocking said rear axle so as to raise or lower the beam.

5. In combination, a main frame, a front steering-axle and wheels, a rear axle rotatably journaled in bearings on the frame, the main wheels rotatable upon said axle, and means for driving said rear wheels to propel the frame; with a laterally-adjustable beam pivotally connected with a shaft on the frame in advance of said rear axle, and in rear of the front axle, a laterally-adjustable link connecting the beam to a bar connected to crank-arms on the rear axle, and a lever and connections for rocking said rear axle so as to raise or lower the rear end of the beam.

6. The combination of the main frame, the front steering-axle, wheels journaled on said axle, the rear axle, the driving-wheels thereon, and means for rocking said rear axle in its bearings independently of the driving-wheels; with means for propelling the driving-wheels, a laterally-adjustable beam having a pivotal slidable connection with a shaft on the frame in advance of the rocking axle, and a laterally-adjustable link connection between the rear end of said beam and a bar or shaft attached to crank-arms on said rear axle, substantially as described.

7. The combination of the main frame, the front steering-axle pivoted to the frame, the wheels thereon; and means for turning the said axle on its pivot; a rear axle rotatably journaled in bearings on the main frame; a lever and connections for rocking said axle in its bearings; an implement hung from said axle, the main driving-wheels journaled on said axle, the main driving-shaft; means mounted upon the main frame for operating said shaft, and sprocket-chains for driving the main wheels from said shaft, substantially as described.

8. The combination of the main frame, the steering-axle, the main axle journaled on the rear end of said frame and rotatable in its bearings; the driving-wheels independently journaled and rotatable upon the ends of the main axle; a driving-shaft journaled in the main frame in advance of the main axle, gearing for driving the main wheels from said main shaft; means mounted upon the main frame for rotating said driving-shaft; a beam pivoted to a fixed point on the frame in advance of the main axle; an implement attached to said frame, a link and crank connecting between the rear end of said beam and the main axle, and the lever and connections for rocking the main axle in its bearings.

In testimony that I claim the foregoing as my own I affix my signature in presence of two witnesses.

JACOB DOWNING.

In presence of—
JOHN A. McINTYRE,
WALTER S. WIKOFF.